United States Patent [19]

Bender et al.

[11] Patent Number: 5,362,818
[45] Date of Patent: Nov. 8, 1994

[54] MODIFIED CYCLOPENTADIENE RESIN

[75] Inventors: Albert Bender; Lothar Bothe, both of Mainz; Manfred Finke, Kelkheim; Gerhard Werner, Glashuetten, all of Germany

[73] Assignee: Hoechst Aktiengesellschaft AG, Germany

[21] Appl. No.: 42,542

[22] Filed: Apr. 5, 1993

[30] Foreign Application Priority Data

Apr. 8, 1992 [DE] Germany ............................. 4211721

[51] Int. Cl.$^5$ ...................... C08L 61/10; C09D 11/08; C09D 11/10
[52] U.S. Cl. .................................. 525/391; 525/54.4; 525/501.5; 525/502; 524/270; 106/30 R
[58] Field of Search ..................... 525/391, 54.4, 501.5, 525/502; 524/270; 106/30 R

[56] References Cited

U.S. PATENT DOCUMENTS

| | | |
|---|---|---|
| 3,880,788 | 4/1975 | Rudolphy . |
| 4,139,500 | 2/1979 | Rudolphy ........................ 525/54.44 |
| 4,506,059 | 3/1985 | Hultzsch et al. ................. 525/54.44 |
| 4,552,592 | 11/1985 | Rudolphy et al. ............... 525/54.44 |
| 4,552,923 | 11/1985 | Tsuchiya et al. . |
| 4,574,057 | 3/1986 | Kaza et al. . |
| 4,976,783 | 12/1990 | Werner ............................. 525/134 |

FOREIGN PATENT DOCUMENTS

| | | |
|---|---|---|
| 0214526 | 3/1987 | European Pat. Off. . |
| 2488613 | 2/1982 | France . |
| 2150216 | 4/1973 | Germany . |
| 2406555 | 8/1975 | Germany . |

Primary Examiner—Vasu S. Jagannathan
Attorney, Agent, or Firm—Bierman and Muserlian

[57] ABSTRACT

Modified cyclopentadiene resins comprising essentially
a) 20 to 80% by weight of cyclopentadiene compounds,
b) 1 to 40% by weight of natural resin acids and
c) 31 to 70% by weight of phenol resins.

These compounds are suitable as binder resins for printing inks. They are distinguished by excellent compatibility with aromatics-free mineral oils and with vegetable oils.

3 Claims, No Drawings

MODIFIED CYCLOPENTADIENE RESIN

The invention relates to oil-soluble dicyclopentadiene resins which are modified by natural resins and phenol resins, have excellent compatibility with mineral oils and vegetable oils and can advantageously be used as binder resins in offset printing inks, and processes for their preparation.

If, for environmental reasons, mineral oils having a low aromatics content are used instead of aromatics-rich ones in inks for offset printing, the resins used in the formulation should have particularly good compatibility with mineral oils, owing to the comparatively poorer dissolving power of these mineral oils. It has already been proposed to prepare such resins by reacting natural resin acids with hydrocarbon resins and phenol/aldehyde condensates (German Patent No. 2,406,555). However, these resins have the disadvantage that the hydrocarbon resins suitable for this purpose are specific polymers which the petrochemical industry must obtain from specific cuts and which therefore can be available only in limited amounts. This is disadvantageous for the further processor, who must aim for a secure production base.

These hydrocarbon resins are also available in solid form. However, it is known that the solids are more inconvenient to handle than liquids. Resin dusts are formed during filling of production plants; expensive extraction systems are then required for safe handling of these substances which are toxicologically unsafe. On the other hand, liquids permit a simpler procedure since they can be transported through closed pipe systems during filling and during loading of vessels.

Reaction products of natural resin acids with liquid cyclopentadiene compounds are also known. It has also been proposed to react these copolymers with ethylenically unsaturated compounds, such as, for example, maleic anhydride or styrene and maleic anhydride and then, if required, with phenol/aldehyde condensates. Owing to the additional introduction of polar groups, however, the required good compatibilities with the nonpolar aliphatic mineral oils are no longer achieved thereby. In addition, such resins have only limited compatibility with vegetable oils, which may also be components of offset printing inks. For example, U.S. Pat. No. 4,976,783 describes the reaction of dicyclopentadiene with maleic anhydride, styrene, rosin and resol. These products have a relatively low content of phenol resins since the latter is present in the copolymer only in an amount of not more than 30% by weight.

The object of the invention was therefore to develop an improved process for the preparation of resins which contain cyclopentadiene units and which have excellent compatibility with vegetable oils and mineral oils having a low aromatics content, for inks for offset printing, based on more readily available raw materials, which are furthermore capable of being processed in a simple manner.

This object could be achieved, according to the invention, by starting from the resins described in U.S. Pat. No. 4,976,783 and dispensing with the polymerization of maleic acid and styrene and instead increasing the amount of phenol resin.

The present invention relates to modified cyclopentadiene resins comprising essentially a) 20 to 80% by weight of cyclopentadiene compounds,
b) 1 to 40% by weight of natural resin acids and
c) 31 to 70% by weight of phenol resins.

The novel resins preferably contain 25 to 60, in particular 30 to 50, % by weight of cyclopentadiene compounds, 5 to 30, in particular 10 to 20%, by weight of natural resin acids and 35 to 60, in particular 40 to 55%, by weight of phenol resins.

The preparation of these modified cyclopentadiene resins can be carried out in a one-pot reaction by reacting the components a), b) and c) simultaneously with one another. Preferably, however, the components a) and b) are first reacted with one another and this reaction product is then allowed to react with the component c). In a further variant, it is also possible to adopt a procedure in which the reaction product of a) and b) is reacted not with the prepared phenol resin c) but with its starting compounds, i.e. with the corresponding phenol and the aldehyde.

Cyclopentadiene compounds a) which are liquids are to be understood as meaning cyclopentadiene, oligomers thereof, such as dimers, trimers and tetramers obtainable by Diels-Alder addition and the alkyl derivatives or cooligomers of these compounds, e.g. methylcyclopentadiene, cyclopentadiene/isoprene dimers and cyclopentadiene/ piperylene dimers. The relevant starting substances need not have high purity. It is possible to use, for example, fractions, in particular concentrated fractions, which are formed in the thermal dimerization of a C5 fraction, this C5 fraction being obtained as a byproduct in the thermal decomposition of naphtha and corresponding mineral oil fractions. In such a dimerization, the methylcyclopentadiene or cyclopentadiene contained in such a fraction is converted into dicyclopentadiene, dimethylcyclopentadiene, a dimer of cyclopentadiene and methylcyclopentadiene, a dimer of cyclopentadiene and isoprene, a dimer of cyclopentadiene/piperylene and other corresponding dimeric substances.

Further unsaturated monomers, such as, for example, propylene, butene, butadiene, pentene, cyclopentene or cyclohexene may also be present in these fractions.

So-called C9 fractions which are formed as a byproduct in the cracking of naphtha and the like may also be present. These then comprise, for example, styrene, alphamethylstyrene, vinyltoluene, indene, methylindene or mixtures thereof.

Accordingly, a relatively high purity of the component a) is not always necessary, but it is preferable if cyclopentadiene units are present in an amount of 70% by weight or more.

Suitable natural resin acids b) are, for example, rosin, tallow resin acid, wood rosin, polymerized, disproportionated or hydrogenated rosin. With these resins, it is possible, for example, to control the viscosity of the reaction products according to the invention. The natural resins can be used as such or in the form of their esters or resinates. These can be prepared, for example, by at least partial esterification with monohyodric and-/or polyhydric alcohols having up to 12 carbon atoms, such as methanol, ethanol, propanol, the butanols, pentanols, hexanols, heptanols, octanols, nonanols, dodecanols, diols having 2 to 8 carbon atoms, such as ethanediol, the propanediols, butanediols, pentanediols, hexanediols, glycerol, trimethylolpropane, or pentaerythritol, and/or by at least partial neutralization with compounds of metals of groups II and/or III of the Periodic Table of elements, e.g. oxides, hydroxides, carbonates or acetates of zinc, calcium and/or magnesium, with salt formation. On the other hand, it is also possible for the acidic groups of the natural resins to be subsequently reacted in a manner known per se, with resinate formation and/or ester formation, but the first-mentioned possibility is preferred.

The copolymerization of a) with b), which is carried out by means of free radicals or, preferably, thermally, can be effected in the absence of a solvent or in the presence of inert solvents.

For example, aromatic hydrocarbons, such as benzene, toluene, xylenes and tetrahydronaphthalene, aliphatic hydrocarbons, such as isooctane, mineral spirit and mixtures of alkylated benzenes having a boiling range from 100° to 200° C. Suitable catalysts for the free radical polymerization, which is less preferable, are, for example, peroxides, such as di-tert-butyl peroxide, benzoyl peroxide, tert-butyl hydroperoxide, cumyl hydroperoxide or the like. Owing to the high reaction temperature, the process is preferably carried out under elevated pressure. It is preferably up to 10 bar. Owing to the sensitivity of the reaction products to oxidation, it is also advantageous to work in the atmosphere of a gas which is inert under the reaction conditions, such as nitrogen or carbon dioxide.

The process according to the invention can be carried out in various ways. In the case of relatively small batches, it is possible to take the components a) and b) together and then to heat them to the desired temperature. In the case of larger batches, however, owing to the resulting heat of reaction it is advisable to take the natural resin acid b) and heat it to the reaction temperature, and subsequently to meter in the cyclopentadiene compounds a). However, it is also possible first to heat the solvent and then to meter in the component b), which is advantageously in solution, and the component a). The reaction temperature for the reaction of components a) and b) is 200° to 300° C., preferably 230° to 270° C. After the end of the reaction, the copolymers obtained can, if required, be isolated as solids by distilling off solvents and unconverted monomers. Their softening point is in general between 40° and 200° C. However, it is simpler if the copolymers obtained by reaction of a) with b) are reacted, without prior isolation, with the phenol/aldehyde condensates c). This embodiment is therefore preferred.

Suitable phenol resins as component c) are novolaks or resols, such as those obtained from phenol, which however is advantageously present in only a relatively small amount, from phenols substituted by hydrocarbon radicals, such as alkylphenols, e.g. those having 1 to 12 carbon atoms in the alkyl radical, arylphenols or aralkylphenols, e.g. cresols, such as m-cresol, 1,3,5-xylenols, isopropyl-, p-tert-butyl-, amyl-, octyl- or nonylphenol, phenylphenol or cumylphenol, or from diphenylolpropane. Suitable aryl- or aralkylphenols or phenols substituted by other carbocyclic groups are those obtained by subjecting unsaturated monomers, such as styrene, alpha-methylstyrene, alpha-chlorostyrene, vinyltoluene, cyclopentadiene and the like, to an addition reaction with phenols in a known manner using acidic catalysts. Owing to the predominant amount of alkyl- or aralkylphenols, the desired compatibilities of the reaction products with aliphatic hydrocarbons can be achieved. The resins obtained from at least trifunctional phenols, i.e. phenols in which three o- and/or p-positions relative to at least one phenolic OH group are free and reactive, are not preferred, preferred resins being those obtained from bifunctional phenols. The abovementioned at least trifunctional phenols or the corresponding phenol resins are generally used only together with the bifunctional phenolic components, for example the stated alkylphenols and/or the adducts of phenols with unsaturated monomers. Here, the at least trifunctional phenols, e.g. phenol or diphenylolpropane, may be concomitantly used in an amount of, preferably, up to 10% by weight, based on the total amount of phenols. The solubility of the end products, in particular in alphatic hydrocarbons, can be controlled by the metering of the trifunctional phenols. On the other hand, the solubility of the products in aromatic hydrocarbons can be increased by means of a higher content of trifunctional phenols.

For example, aldehydes having 1 to 7 carbon atoms, in particular formaldehyde in various monomeric and polymeric forms, as well as other aldehydes, such as acetaldehyde, butyraldehyde, isobutyraldehyde, benzaldehyde or furfurol, may be mentioned as aldehyde components of the phenol resins. The molar ratio of phenol to aldehdye, for example including condensed aldehyde, may vary within wide limits, for example at least 1 : 0.9 and not more than 1 : 3.5, preferably 1: (1 to 2.5), and any unconsumed aldehyde can be distilled off. The viscosity of the end products can be conveniently controlled by the nature and amount of the phenol resin components in the starting mixture. The phenol resins can also be used in the form of condensates of various phenols. On the other hand, they can, if required, also be reacted in the form of adducts which were obtained by an addition reaction of unsaturated monomers, for example the above-mentioned ones, with the resols. If the phenol resins based on alkylphenols or components thereof are reacted, it may be advantageous to react mixtures of alkylphenols which contain at least 25, preferably at least 50%, by weight of nonylphenol. This embodiment has the advantage that products having particularly good compatibility with mineral oils can be prepared.

The reaction of the phenol resins c) with the copolymers formed from a) and b) is carried out in such a way that the phenol/aldehyde condensates are metered into the copolymer melt or into the solution at the desired temperature, the water of reaction formed being distilled off. The reaction temperature here is in general from 100° to 270° C., preferably from 120° to 260° C.

It is not absolutely essential to use a catalyst, but as a rule the reaction is carried out in the presence of an alkaline catalyst, for example sodium hydroxide, potassium hydroxide, magnesium hydroxide, calcium hydroxide, barium hydroxide and/or zinc hydroxide, and oxides, carbonates and/or acetates thereof, for example of zinc, magnesium or calcium; i.e. all basic condensing agents known from phenol resin technology are suitable, alone or as a mixture. The amount thereof is in general up to one gram equivalent per mole of phenol, in particular 0.1 to 4.5, preferably 0.2 to 4, % by weight, based on the phenolic components. These catalysts are also suitable for the embodiment of the process according to the invention in which the phenol resin is prepared in the copolymer melt or the copolymer solution from the individual components of the particular phenols and aldehydes.

Precisely in the reaction with the phenol/aldehyde condensates, the introduction of carboxyl groups by the natural resin acids has the advantage of binding the catalyst constituents of the phenol resins or the components thereof in soluble form, e.g. as resinates, during the reaction procedure at elevated temperatures. This prevents salt-like insoluble constituents from remaining in the end products. These catalyst constituents would present very considerable problems in the product and would therefore have to be removed in some way, for example by washing out. The conversion of the catalyst constituents by the natural resin acids is therefore particularly advantageous if, according to the invention, phenol resols with up to 4.5% by weight of catalyst, based on the weight of the phenol, which are not neutralized and whose catalyst has not been washed out, are used for the modification. Thus, washing out can be avoided by reaction with natural resin acids, and wastewater pollution harmful to the environment thus does not occur.

It is also possible to use catalyst-free phenol resins or components thereof for the modification and, if required, to esterify or to neutralize the natural resin acid components. However, it is also possible concomitantly to use, for example, catalyst-containing resols or components thereof and at the same time alcohols as esterifying agents from the outset or subsequently to produce resinate and/or ester groups. However, it is also possible, if required, to prepare only resinates by adding metal compounds.

The esterification or salt formation may occasionally be advantageous when the polarity of the resins according to the invention and the pigment wetting capability are to be further increased. This is particularly important for use as the dispersing resin or as a flush resin.

Suitable esterifying agents are, for example, methanol, ethanol, propanol, n-butanol, secondary and tertiary butanols, isobutanol, allyl alcohol, ethylhexyl alcohol, nonyl alcohol, dodecyl alcohol, cyclohexanol, benzyl alcohol or oleyl alcohol, and ethylene glycol, diethyl alcohol, glycerol, pentaerythritol or neopentylglycol. The melt viscosity of the resins can be simultaneously reduced by means of the monofunctional aliphatic alcohols having more than 5 carbon atoms. If esterification is carried out with polyfunctional alcohols, the solution viscosity of the resins is increased. The amount of the alcohol depends on the desired viscosity. It may be up to 10 mol % per carboxyl group in the case of the polyhydric alcohols and up to 100 mol % per carboxyl group in the case of monohydric-alcohols. Excessively high proportions lead to gel formation.

The subsequent esterification is generally carried out by a method in which the alcohols react with the hydrocarbon resins according to the invention, either in the melt or in one of the solvents described above. At esterification temperatures above 220° C., as are required in particular in the case of high-melting binders for printing inks, the good thermal stabilities of the products have proven useful. The esterification can be carried out completely without simultaneous occurrence, on a relatively large scale, of undesirable thermal degradation reactions, for example by polymerization, which lead to more poorly compatible resins.

In addition to the salt formers of group II or III of the Periodic Table of elements, salt formation may also be effected completely or partially with those of group I. Examples are the acetates and formates, but preferably the hydroxides and alcoholates, in each case individually or as a mixture, for example of lithium, sodium and potassium. However, it is also possible to react some or all of the acid groups with ammonia, mono- and polyfunctional amines or combinations thereof. Suitable amines are aliphatic, aromatic and cycloaliphatic nitrogen compounds, for example primary or secondary amines which are unsubstituted or substituted by at least one alkyl group, as well as polyamines, such as ethylened-jamine, diethylenetriamine, triethylenetetramine or the like, and also quaternary ammonium bases. The aliphatic radical of these compounds may also contain oxygen in an ether-like bond. In the case of cycloaliphatic amine, the nitrogen atom may be incorporated outside the ring or in the ring itself. Morpholine is an example of a cycloaliphatic amine in which the oxygen and the amine nitrogen are in the cycloaliphatic ring. 3-Aminopropylimidazole is the example of an aromatic nitrogen compound having two nitrogen atoms in the ring, one of which carries an aminoalkyl substituent. Advantageously, up to 30, preferably from 5 to 15, mol % of the carboxyl groups may be modified by reaction with ammonia or amines or salt formation.

The continuation of the reaction to give the resins according to the invention is monitored by determining typical characteristics, such as, for example, acid number or viscosity in a suitable solvent. As soon as the desired values are reached, the reaction is terminated by cooling to room temperature. If solvents present in the reaction mixture, they are advantageously removed beforehand, for example by volatilization, such as distillation. In some cases, however, it may be desirable to leave the solvents, in particular mineral oils having a high aliphatics content—for example with a boiling range from 240° to 320° C.—at least partially in the products in order to vary the melting point and viscosity of the resin according to requirements. All possibilities from solid through a liquid resin/mineral oil varnish to a solution are applicable here.

On the other hand, it is also possible for products of the invention which are obtained according to the invention, in particular those having a high melting point, to be diluted after the reaction, for example with mineral oils having a high aliphatics content, and for the melting point and viscosity thus to be reduced.

The products prepared according to the invention are very highly compatible resins. To determine the mineral oil compatibility or the solubility in mineral oil to give a clear solution, they are each dissolved at 180° C. to give 50% strength by weight solutions, and the solutions are cooled to 23° C. and immediately titrated with the same mineral oil while stirring until turbidity occurs (turbidity point). The ratio of 1 part by weight of resin to x parts by weight of mineral oil present in the solution at the turbidity point is defined as the compatibility. The compatibility in linseed oil is determined analogously. The resins according to the invention are compatible with standardized aromatics-containing mineral oil (boiling range 240° to 270° C., aquiline point 72° C.) at least in a ratio of 1 : 5, preferably at least 1 : 10, and with standardized aromatics-free mineral oil (boiling range 240° to 270° C., aniline point 92° C.) at least in a ratio of 1 : 1. However, they also release the components of these solvents rapidly. The products according to the invention are compatible with linseed oil at least in a ratio of 1 : 5, but preferably at least 1 : 10.

The products according to the invention are compounds having high melting points. They have a melting range of 120° to 225° C., preferably 135° to 200° C.

The viscosity of the products (in 50% strength solution in toluene/23° C.) is in general 50 to 600 mPa.s. The melting points and viscosities may also be above or below the stated ranges, but the above ranges are of particular interest owing to the usefulness of the products as printing ink binder resins. Products having an acid number of 10 to 30, preferably 10 to 20, mg KOH/g of resin are also particularly advantageous.

The molecular weights of the resins according to the invention can be determined by gel permeation chromatography of the resin solutions in tetrahydrofuran over polystyrene foam in a permeation measuring apparatus by known methods. According to the measured values obtained, the molecular weight (weight average $M_w$) of the resins according to the invention preferably has values of $M_w > 3,000$ and the upper limit is not critical. However, the molecular weights $M_w$ are particularly preferably in an average range between 4,000 and 50,000, in particular 5,000 to 30,000.

Solutions of the products in aliphatic mineral oils can be used as varnishes for coatings, in particular paints and printing inks. For this purpose, they can be readily processed with alkyd resins, siccatives, such as naphthenates or octoates of cobalt, zinc, manganese, lead or the like, and pigments, and with, generally in an amount of up to 1% by weight, chelate-forming metal compounds, such as titanates or aluminum alcoholates, to give printing ink binders for sheet-fed or reel-fed offset printing. The chelate formers may facilitate a certain degree of gel formation to the desired extent and hence also help to achieve more rapid drying and better anchoring to the paper.

The Examples below serve to illustrate the invention without restricting it.

EXAMPLE 1

Preparation from copolymer and resol 300 g of rosin are heated to 260° C. in a 3 liter pressure apparatus. 700 g of dicyclopentadiene containing 75% of cyclopentadiene units are metered in within 2 hours, and the mixture is kept at this temperature for a further 5 hours while stirring; during this procedure, the pressure, which initially increased to 9 bar, decreases to 5 bar. The melt is then allowed to cool to 160° C. 710 g of a water-soluble resol obtained from 1,860 g of nonylphenol and 510 g of formaldehyde (processing viscosity 250 mPa.s, residue on drying 68% after heating for one hour at 135° C.) are metered into this cooled melt. With constant removal of water, the mixture is heated to 250° C. and then, on reaching a viscosity of 100 mPa.s of a 50% strength toluene solution at 23° C., down to 50 mbar while distilling off the volatile components. Yield 1402 g, melting point 145° C., acid number 11 mg KOH/g, viscosity of a 40% strength solution in linseed oil at 350 dPa.s/23° C., compatibility with a mineral oil having a low aromatics content and a boiling range of 240°-270° C. and having an aniline point of 72° C. better than 1 : 20, and with an aromatics-free mineral oil having a boiling range of 240°-270° C. and an aniline point of 92° C. 1 : 2. The compatibility with linseed oil is infinite at 23° C. The weight average molecular weight $M_w$ is 7,550.

EXAMPLE 2

Preparation from copolymer and resol components under Mg catalysis 300 g of rosin are heated to 260° C. in a 3 liter pressure apparatus. 700 g of dicyclopentadiene containing 75% of cyclopentadiene units are metered in within 2 hours and the mixture is kept at this temperature for a further hours while stirring; during this procedure, the pressure, which initially increased to 9 bar, decreases to 5 bar. The melt is then allowed to cool to 110° C. 2 g of magnesium oxide, 627 g of nonylphenol and 172 g of formaldehyde are then added and condensation is carried out for 4 hours at 150° C., the pressure increasing to 4 bar. The pressure is then let down and, with constant removal of water, the mixture is heated to 250° C. and then, on reaching a viscosity of 300 mPa.s of a 50% strength toluene solution at 23° C., down to 50 mbar while distilling off the volatile components. Yield 1,422 g, melting point 155° C., acid number 19 mg KOH/g, viscosity of a 40% strength solution in linseed oil 1,850 dPa.s/23° C., compatibility with an aromatics-free mineral oil having a boiling range of 240°-270° C. and an aniline point of 92° C. 1 : 1.2. The compatibility with linseed oil is infinite.

EXAMPLE 3

Preparation from copolymer and styrenated resol 333 g of rosin are heated to 260° C. in a 3 liter pressure apparatus. 666 g of dicyclopentadiene containing 75% of cyclopentadiene units are metered in within 2 hours and the mixture is kept at this temperature for a further 5 hours while stirring; during this procedure, the pressure, which initially increased to 9 bar, decreases to 5 bar. The melt is then allowed to cool to 160° C. 605 g of a styrene-modified resol obtained from 1,800 g of p-tert-butylphenol, 737 g of formaldehyde and 150 g of styrene are introduced into this cooled melt. With constant removal of water, the mixture is heated to 250° C. and then, on reaching a viscosity of 100 mPa.s of a 50% strength toluene solution at 23° C., down to 50 mbar while distilling off the volatile components. Yield 1,390 g, melting point 164° C., acid number 18 mg KOH/g, viscosity of a 40% strength solution in linseed oil 580 dPa.s/23° C., compatibility with an aromatics-free mineral oil having a boiling range of 240°-270° C. and an aniline point of 92° C. 1 : 1. The compatibility with linseed oil is infinite.

EXAMPLE 4

Preparation from copolymer and resol components with zinc catalysis and esterification 600 g of rosin and 200 g of xylene are heated to 260° C. in a 3 liter pressure apparatus. 600 g of 80% strength dicyclopentadiene are metered in within 2 hours and the mixture is kept at 260° C. for a further 5 hours while stirring: during this procedure, the pressure, which initially increased to 10 bar, decreases to 5 bar. The melt is then allowed to cool to 110° C., 60 g of glycerol, 600 g of p-tert-butylphenol, 4 g of zinc carbonate and 178 g of paraformaldehyde are added and condensation is effected under reflux for two hours at 130° C. The mixture is then heated to 250° C., xylene and water distilling off. On reaching an acid number of 15 mg KOH/g, evacuation is effected down to 50 mbar to remove low boilers. 1,613 g of solid resin having a melting point of 124° C. are obtained. It has an acid number of 14 mg KOH/g and, in the form of a 40% strength solution in a mineral oil having a boiling range of 240°-270° C. and an aniline point of 72° C., a viscosity of 45 dPa.s.

EXAMPLE 5

Preparation from copolymer and a mixed resol 300 g of rosin and 700 g of 78% strength dicyclopentadiene are heated to 260° C. in a 3 liter pressure apparatus. After five hours, the mixture is cooled to 160° C. and the apparatus is brought to atmospheric pressure. A sample taken from the melt solidifies at between 125° and 130° C.

800 g of a water-soluble resol prepared from 650 g of nonylphenol, 44 g of diphenylolpropane and 216 g of paraformaldehyde are then introduced into the melt. The mixture is then heated to 250° C. and the volatile components are distilled off, finally in vacuo at 50 mbar. 1,506 g of offset printing ink resin having a melting point of 143°–153° C. are obtained. It has an acid number of 13 mg KOH/g and, as a 40% strength solution in a mineral oil having a boiling point of 240°–270° C. and an aniline point of 72° C., a viscosity of 70 dPa.s, and dissolves in an aromatics-free mineral oil having a boiling point of 240°–270° C. and an aniline point of 92° C. in a ratio of 1 : 1.1 to give a clear solution. The weight average molecular weight $M_w$ is 22,450.

EXAMPLE 6

Preparation from copolymer and two different resols 1,500 g of rosin are heated to 250° C. under nitrogen in a 20 liter autoclave, a pressure of 2.5 bar being established. 3,500 g of dicyclopentadiene (75–80% strength) are metered in within 45 minutes. After the metering, the pressure is 9 bar. The mixture is then kept at 250° C. for a further 5 hours, the pressure decreasing to 5 bar, and the apparatus is let down. A mixture of 1,500 g of xylene, 3,000 g of a resol (processing viscosity 200–300 mPa.s, residue on drying 1 h/135° C. 68%) prepared from 3,720 g of nonylphenol and 2,760 g of 37% strength formaldehyde, and 1,000 g of a resol (processing viscosity 340–370 mPa.s) prepared from 1,305 g of p-tert-butylphenol, 245 g of 37% strength formaldehyde and 484 g of 91% strength formaldehyde are added dropwise in the course of 3 hours to the melt which has been cooled to 160° C., the water formed being distilled off azeotropically. The mixture is then heated to 260° C., further volatile components disliking off. The reaction is terminated when a 50% strength toluene solution has reached a viscosity of 220 mPa.s. 7,080 g of the solid resin having a melting point of 155° C. and an acid number of 19 mg KOH/g are obtained. When dissolved in a mineral oil having a low aromatics content, a boiling range of 240°–270° C. and an aniline point of aniline point of 72° C. to give a 40% strength solution, it has a viscosity of 65 dPa.s. Its compatibility in an aromatics-free mineral oil having a boiling point of 240°–270° C. and an aniline point of 92° C. is 1 : 2.

EXAMPLE 7

Preparation of a dispersing varnish 300 g of rosin and 700 g of 75% strength dicyclopentadiene are heated to 260° C. in a 5 liter pressure apparatus. After five hours, the stirred melt is cooled to 160° C. and the apparatus is brought to atmospheric pressure. 710 g of a water-soluble resol obtained from 1,860 g of nonylphenol and 510 g of formaldehyde (processing viscosity 250 mPa.s, residue on drying 68% after heating for one hour at 135° C.) are metered into this melt. With constant removal of water, the mixture is heated to 250° C. until a 50% strength toluene solution reaches a viscosity of 100 mPa.s/23° C. 12.5 g of 3l-aminopropylimidazole are then added, stirring is continued for 1 hour and volatile components are distilled off in vacuo at 50 mbar. 2,100 g of a mineral oil having a boiling point of 240°–270° C. and an aniline point of 72° C. are then allowed to run in. After cooling, the varnish has a viscosity of 10 dPa.s/23° C. It can be used for flusing water-moist pigment cakes and for dispersing pigments.

EXAMPLE 8

A printing ink for sheet-fed offset printing was prepared from the product of Example 2 according to the following formulation, and its performance characteristics were tested.

A varnish for use which contains 35% by weight of the printing ink resin, 13% by weight of a commercial alkyd resin (viscosity 200 dPa.s, oil length 76%), 19% by weight of linseed oil and 33% by weight of high-boiling mineral oil having a boiling range of 280° to 310° C. is prepared.

A printing ink paste which contains 32% by weight of pigment and 68% by weight of varnish is prepared with lithol rubin L6B by dispersing on a three-roll mill.

A ready-to-print ink which comprises 50% by weight of the paste, 41% by weight of the varnish for use, 7.5 % by weight of mineral oil having a boiling range of 280° to 310° C. and 1% by weight of a siccative is prepared therefrom by dilution with the varnish for use and mineral oil and with the addition of manganese naphthenate as a siccative, in a disk mill.

This ink was printed on the test press from Prüfbau on APCO II/II coated paper, and test prints were evaluated as a function of the amount of ink transferred. The tack of the ink, the gloss and ink density of the printed films and the absorption behavior thereof were determined. The results of the tests for this printing ink are shown in the Table. In the Table, tack is a measure of the ink transfer, measured using an Inkomat from Prüfbau, gloss and ink density are measured with a Lange laboratory refractometer at an angle of incidence of 60° and absorption is a measure of drying, which is assessed with the aid of the test press, the proof, immediately after production, being brought into contact with unprinted paper. The less ink transferred as a result of the contact, the better is the drying. The evaluation is carried out visually, the rating 1 meaning very good behavior and the rating 6 very poor behavior.

| | | | |
|---|---|---|---|
| Viscosity of varnish used [Pa.s/23° C., shear gradient 50 s$^{-1}$] | | 30 | |
| Viscosity of printing ink [Pa.s/23° C., shear gradient 50 s$^{-1}$] | | 43 | |
| Tack of the printing ink at 200 m/s and 23° C. | | 10.3 | |
| Amount of ink transferred [mg/80 cm2] | 10.2 | 11.8 | 15.4 |
| Gloss [%] | 64.4 | 78.6 | 79.8 |
| Ink density | 1.58 | 1.76 | 1.91 |
| Absorption [Rating 1 to 6] | 3.0 | 3.3 | 3.5 |

EXAMPLE 9

A printing ink for reed-fed offset printing was prepared from the product of Example 2 according to the following formulation, and its performance characteristics were tested.

A varnish for use which contains 38% by weight of the printing ink resin, 10% by weight of a commercial alkyl resin (viscosity 200 dPa.s, oil length 76%), and 52% by weight of high-boiling mineral oil having a boiling range of 240° to 270° C. is prepared.

A printing ink paste which contains 32% by weight of pigment and 68% by weight of varnish is prepared with lithol rubin L6B by dispersing on a three-roll mill.

A ready-to-print ink which comprises 50% by weight of the paste, 43% by weight of the varnish for use, 6% by weight of mineral oil having a boiling range of 240° to 270° C. and 1% by weight of a siccative is prepared therefrom by dilution with varnish for use and mineral oil and with the addition of manganese naphthenate as a siccative, in a disk mill.

This ink was printed on the test press from Prüfbau on APCO II/II coated paper, and test prints were evaluated as a function of the amount of ink transferred.

| | | | |
|---|---|---|---|
| Viscosity of varnish used [Pa.s/23° C., shear gradient 50 s$^{-1}$] | 11 | | |
| Viscosity of printing ink [Pa.s/23° C., shear gradient 50 s$^{-1}$] | 28 | | |
| Tack of the printing ink at 200 m/s and 23° C. | 10.3 | | |
| Amount of ink transferred [mg/80 cm2] | 10.2 | 13.0 | 17.4 |
| Gloss [%] | 63.4 | 65.2 | 67.88 |
| Ink density | 1.71 | 1.84 | 1.94 |
| Absorption [Rating 1 to 6] | 1.70 | 2.0 | 2.3 |

Two Comparative Examples were prepared according to U.S. Pat. No. 4,976,783. These have substantially poorer compatibility in aromatics-free mineral oils and in vegetable oils, such as, for example, linseed oil, which greatly restricts their potential uses in printing inks for offset printing in comparison with the products according to the invention. The latter therefore all have superior properties.

COMPARATIVE EXAMPLE 1

Example 3 stated in the U.S. Pat. (65% by weight of DCPD, 25% by weight of tallow resin, 5% by weight of tert-butylphenol resol and 5by weight of styrene) is prepared. When dissolved in a ratio of 1 : 1 at 180° C., after cooling to 23° C. the resin is incompatible with an aromatics-free mineral oil having a boiling range of 240° to 270° C. and an aniline point of 92° C., i.e., the resin separates out from the mixture. The same applies in an analogous manner to the compatibility test with linseed oil.

COMPARATIVE EXAMPLE 2

Example 7 stated in the U.S. Patent (48% by weight of DCPD, 45% by weight of rosin, 5% by weight of tert-butylphenol resol and 2% by weight of maleic anhydride) is prepared. When dissolved in a ratio of 1 : 1 at 180° C., after cooling to 23° C. the resin is incompatible with an aromatics-free mineral oil having a boiling range of 240° to 270° C. and an aniline point of 92° C., i.e., the resin separates out from the mixture. The same applies in an analogous manner to the compatibility test with linseed oil.

We claim:

1. A modified cyclopentadiene resin obtained by reacting
    a. 20 to 80% by weight of cyclopentadiene compounds selected from the group consisting of cyclopentadiene, dicylcopentadiene, trimers and tetramers of cyclopentadiene, dimers of cyclopentadiene and isoprene and dimers of cyclopentadiene and piperylene.
    b. 1 to 40% by weight of natural resin acids and
    b. 31 to 70% by weight of phenol resins.

2. A modified cyclopentadiene resin of claim 1 wherein components a) and b) are first reacted and the resulting reaction product is reacted with component c).

3. A printing ink containing as a binder resin the cyclopentadiene resin of claim 1.

* * * * *